United States Patent [19]

Thumm

[11] 4,197,770
[45] Apr. 15, 1980

[54] WORKPIECE SHAPING APPARATUS
[75] Inventor: Helmut Thumm, Metzingen, Fed. Rep. of Germany
[73] Assignee: Sauter Feinmechanik GmbH, Metzingen, Fed. Rep. of Germany
[21] Appl. No.: 941,647
[22] Filed: Sep. 12, 1978
[30] Foreign Application Priority Data
Sep. 10, 1977 [DE] Fed. Rep. of Germany ....... 2742097
[51] Int. Cl.² ............................................. B23B 3/28
[52] U.S. Cl. ................................................. 82/14 C
[58] Field of Search ................... 82/14 R, 14 A, 14 B, 82/14 C
[56] References Cited
U.S. PATENT DOCUMENTS

| 3,014,390 | 12/1961 | Garde et al. | 82/14 C |
| 3,272,039 | 9/1966 | Weaver | 82/14 C |
| 3,921,479 | 11/1975 | Katz | 82/14 A |
| 3,948,122 | 4/1976 | Link et al. | 82/14 C |

Primary Examiner—Harrison L. Hinson
Attorney, Agent, or Firm—Roylance, Abrams, Berdo & Farley

[57] ABSTRACT

A control apparatus for a shaping machine such as a lathe includes a positionable piston and cylinder assembly for driving the cutting tool toward the workpiece to establish cut depth. A feeler rides a pattern to limit cut depth and control cut shape. A plurality of cam-operated switches responsive to piston and cylinder assembly position controls cut depth in successive cycles until control is assumed by the feeler. The feeler operates switches and a control valve to permit close control of the shaping in accordance with the pattern.

2 Claims, 6 Drawing Figures

WORKPIECE SHAPING APPARATUS

This invention relates to an apparatus for the automatic shaping of workpieces, including apparatus for the control of a workpiece cutting tool.

BACKGROUND OF THE INVENTION

Machine tools for the automatic shaping of a workpiece, particularly a machine for the lathe-type in which the workpiece is rotated as it is cut, requires means for controlling the maximum depth of cut. An example of the prior art includes a device in which the maximum extent of the tool position against or into the workpiece is determined by a mechanical drum stop wherein the movable part of an operating cylinder is stopped in the feed direction in the adjusting position of the tool. Such a drum stop used much space and requires switching apparatus for its operation. An apparatus of this type is described, for example, in German Pat. No. 24 16 278, and British Pat. No. 1,137,361.

BRIEF DESCRIPTION OF THE PRESENT INVENTION

An object of the present invention is to provide means for controlling the cut without using the space required for a mechanical drum stop. In accordance with the invention, the components replacing the function of the drum stop can be accommodated, without any significant expenditure of space, within the region of the control arrangement which must be present in any event.

Briefly described, the invention includes an improved apparatus for shaping workpieces in accordance with a pattern, particularly for use in combination with a turning machine of the type having means for supporting a workpiece to be cut, a cutting tool, means for supporting and moving the tool relative to the workpiece, a piston and cylinder assembly having a movable piston coupled to said means for supporting to move said tool, a source of fluid under pressure, a master pattern, a control valve and feeler means for contacting and following the pattern, the improvement comprising the combination of stop valve means having an electrically operated actuator portion for controlling fluid flow to said piston and cylinder assembly, conduit means interconnecting said source of fluid under pressure, said piston and cylinder assembly, said control valve and said stop valve means, said stop valve being connected between said control valve and said piston and cylinder assembly, at least one cam and at least one cam-operated switch, one of said cams and switches being movable with said tool for controlling closing actuation of said stop valve, and feeler switch means responsive to deflection of said feeler for controlling opening of said stop valve means when said feeler is in contact with said pattern.

In order that the manner in which the foregoing and other objects are attained in accordance with the invention can be understood in detail, a particularly advantageous embodiment thereof will be described with reference to the accompanying drawings, which form a part of this specification, and wherein.

Figure 1:
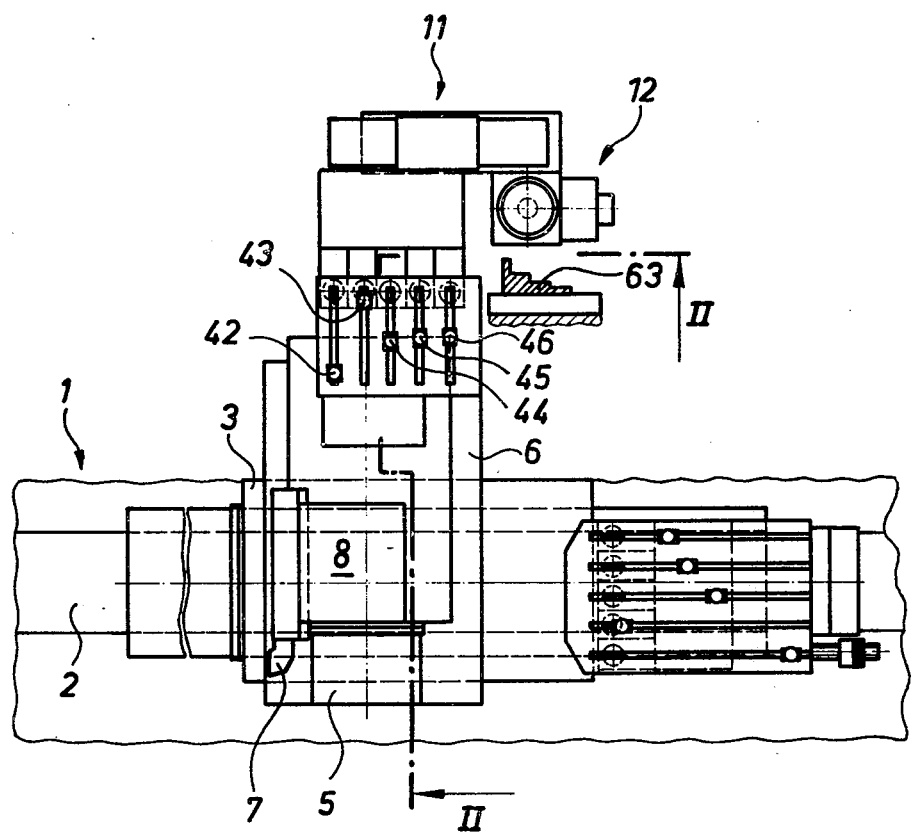
FIG. 1 is a simplified schematic plan view of an apparatus incorporating the present invention.
Figure 2:
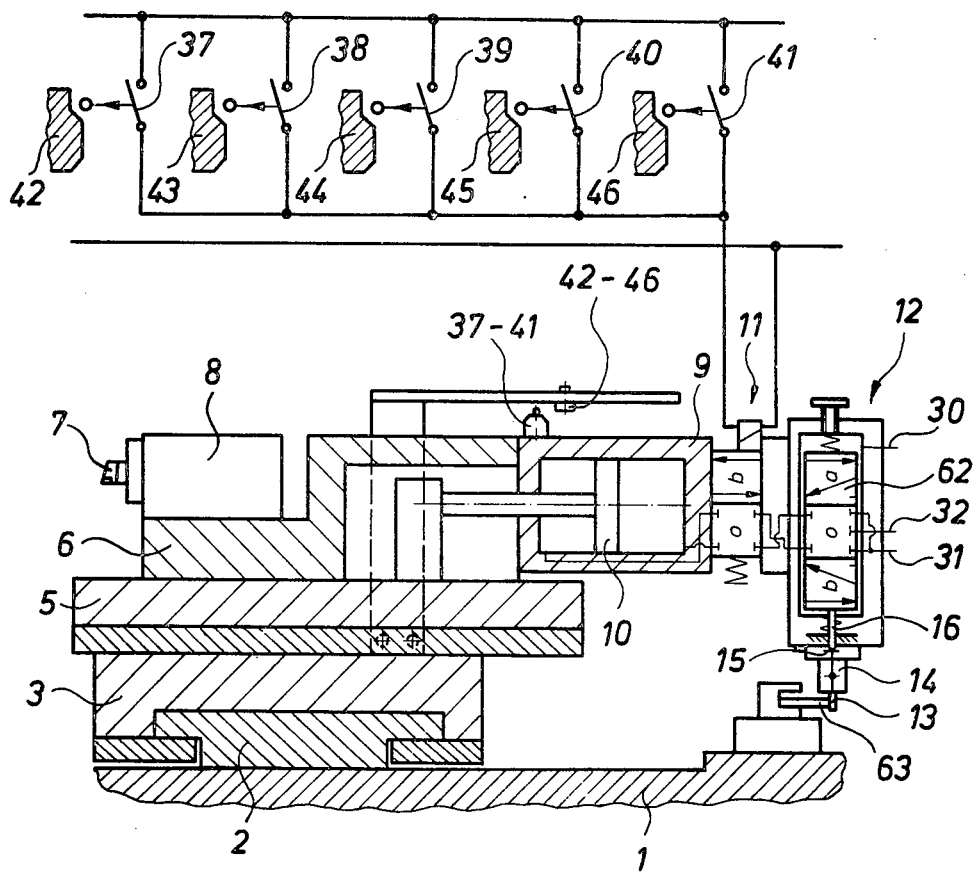
FIG. 2 is an elevation, in section, along line II—II of FIG. 1 and a schematic electric circuit diagram.

Referring first to FIGS. 1–2, a turning machine, such as a lathe, is illustrated generally at 1 and includes a track 2 for supporting a longitudinal carriage 3, the carriage being shiftable or slidable in parallel with the axis of rotation of the chuck of the turning machine. The longitudinal carriage 3 supports a cross-carriage track 5 which is perpendicular to track 2 and which supports a transverse carriage 6 which is shiftable longitudinally with respect to track 5 and perpendicular, or transversely, with respect to the axis of the chuck. The transverse carriage 6 supports a toolholder 8 which is provided with a turning tool 7, the toolholder being connected to and movable with the cylinder jacket 9 (FIG. 2) of a piston and cylinder assembly having an operating piston 10. In this context, the term "turning tool" refers to a cutting tool designed for cutting a turning workpiece. The operating piston 10 is attached to the track 5 of the transverse carriage by means of a piston rod which penetrates one end of cylinder jacket 9. On jacket 9 and movable therewith, there is provided a housing of a stop valve 11 and a sensor block 12 having a copying or pattern-following slide valve 62, the sensor block having a feeler device 14 with a feeler 13. The feeler 13 moves with carriage 9 relative to a master plate 63 which is mounted on the bed of the turning machine. The feeler 13 transfers a radial movement in an axial movement like the lever 69 in FIG. 1 of the British Specification No. 1 137 361 in relation to the control piston 66.

Figure 4:
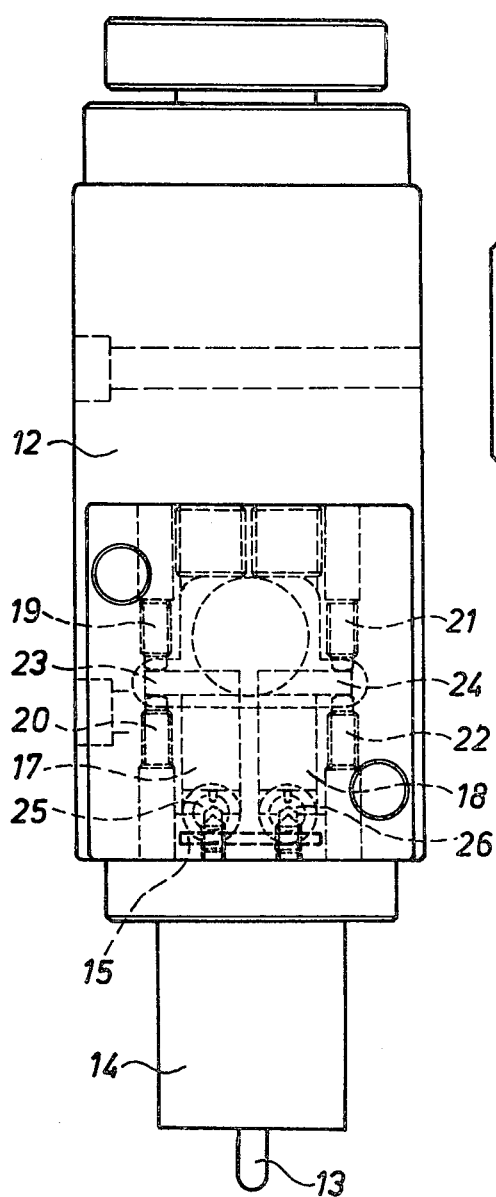
FIG. 4 is an end elevation of the apparatus of FIG. 3.

The feeler 13 of the feeler device 14 can be constructed so that it is laterally deflectable in all directions. Feeler 13 acts through device 14 in an axial direction on a feeler plate 15 which is only axially movable regardless of the direction in which feeler 13 is moved. A sensor pin 16 is attached to copying slide valve 62 which is slidable within sensor block 12, pin 16 being in contact with and movable with feeler plate 15. In a housing 29 forming a part of sensor block 12, there are two microswitches 17 and 18 which are mounted in the block so as to be slidably adjustable in a direction parallel with the axis of feeler plate 15 and the axis of sensor pin 16, the microswitches being accurately positionable by means of adjusting screws. As best seen in FIG. 4, adjusting screws 19 and 20 are provided to adjust a mounting plate 23 which supports switch 17, and adjusting screws 21 and 22 abut mounting plate 24 which carries switch 18. The mounting plates are firmly attached to the microswitches. The actuating members of the microswitches 17 and 18 are operated by operating levers 25 and 26, respectively, operating lever 25 being attached to one end of a leaf or wire spring 27, the other end of which is fixedly attached in a housing 29 by a set screw 28. One end of lever 25 is formed in the shape of a double cone, as illustrated, with one of the cones being disposed with its large end away from spring 27 and pressing slightly against key plate 15, the pressure being supplied by spring 27. Because of the double cone-shaped end of operating lever 25, only its edge is in contact with plate 15. Operating lever 26 is similarly formed and its supporting spring is also attached to housing 29 by a set screw.

Microswitch 17 is adjusted by screws 19 and 20 in such a way upon slight deflection of feeler 13 as a result of contact against pattern plate 63, the operating lever and actuating member associated with microswitch 17 are actuated. The adjustment is made such that feeler 13 need only be deflected by about 0.02 millimeters from its rest position. Microswitch 18 serves as a safety switch and is adjusted by means of its adjusting screws 21 and 22 in such a way that its actuating member responds at a predetermined maximum swiveling angle of feeler 13. This swiveling angle is selected, as a rule, such that microswitch 18 is operated when the volume of through flow of the pneumatic or hydraulic pressure agent in sensor block 12 has reached its maximum.

Figures 3, 5:
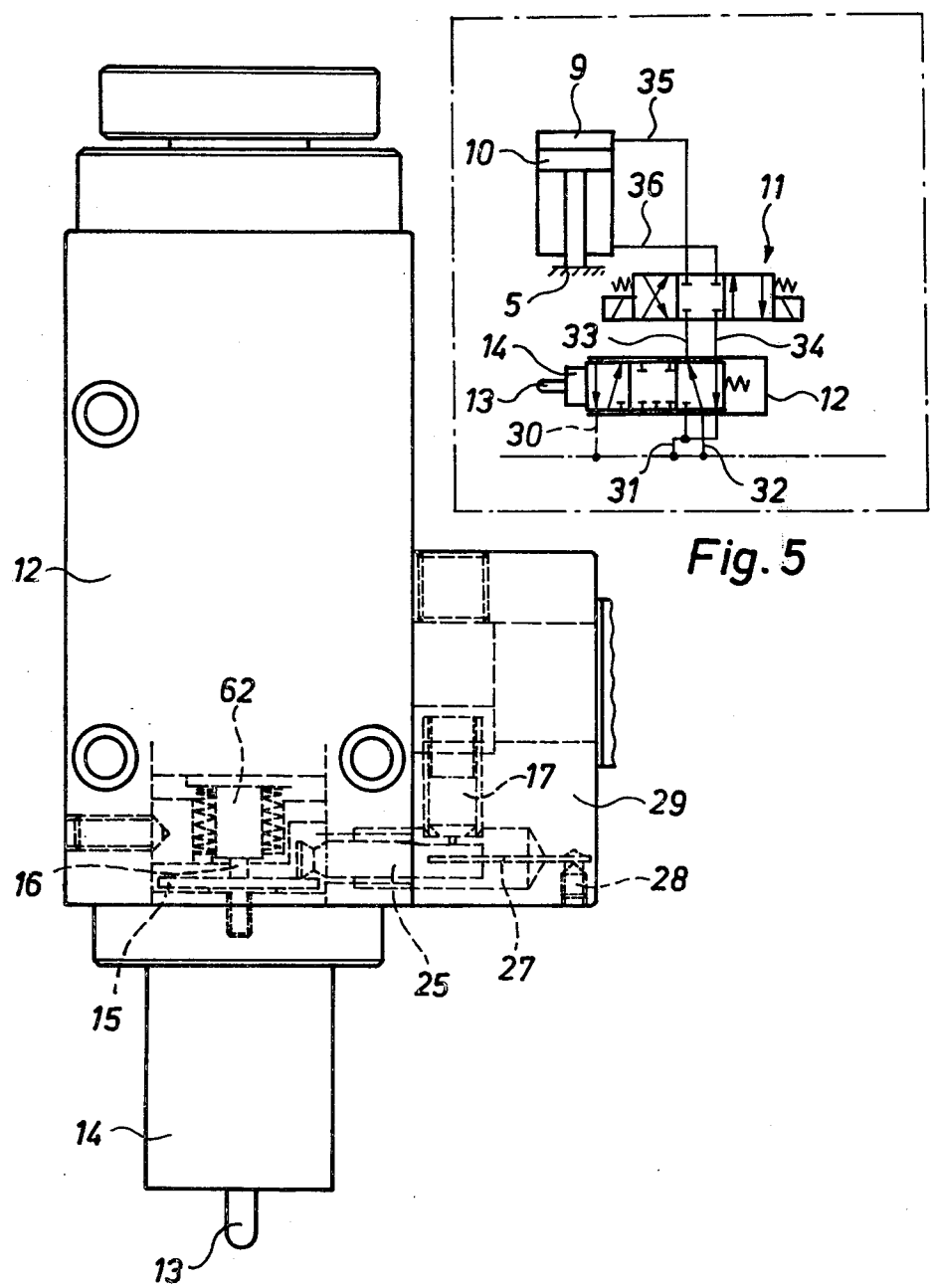
FIG. 3 is an enlarged side elevation of a portion of FIG. 2.
FIG. 5 is a schematic fluid circuit diagram usable in the apparatus of FIGS. 1–4.

As shown in FIG. 5, sensor block 12 is connected by way of a fluid conduit line 30 and by way of a branched return line 31 with a supply tank, not illustrated, these being return lines. Block 12 is also coupled through a pressure line 32 to a pump capable of supplying the fluid under pressure, the pump being conventional and not illustrated. The sensor block 12 has been shown as containing a 5/3-way valve (i.e., a 5 connection, 3 position valve), the other side of which is connected by connecting lines 33 and 34 to a stop valve 11. Valve 11 is an electromagnetic solenoid actuated 4/3-way valve and is connected by means of two fluid conduit lines 35 and 36 to a cylinder jacket 9 of the operating piston and cylinder assembly 9 containing piston 10. It will be noted that in the embodiment described in connection with FIG. 5, the stop valve 11 is combined with the reverse valve. However, the stop valve and reversing valve can be constructed as separate elements and can be arranged with one following the other, the stop valve alone being illustrated in FIG. 2. Both valves in that case are made as 4/2 valves, the stop valve then being characterized by the two right-hand sections schematically shown and the reversing valve by the two outside sections of the stop valve according to FIG. 5.

As shown in FIG. 5, in the middle position of its control slide, the stop valve 11 blocks the connection between conduit lines 33 and 35 or 34 and 36. In one extreme position, line 33 is connected to line 35 and line 34 is connected to line 36, and in the other terminal position, lines 33 and 36 are interconnected and lines 34 and 35 are interconnected for the reversal of the direction of flow to and from the cylinder jacket 9.

A plurality of electric switches 37–41 are mounted in side-by-side relationship on the upper portion of transverse carriage 6 in a line which extends transversely to its direction of movement, the operating members of these switches being disposed upwardly to come in contact with associated ones of cams 42–46. The cams are supported on slide 3 and are therefore fixed with respect to the movement of carriage 6. However, they are adjustable along grooves which extend in parallel to the direction of movement of transverse carriage 6 and are therefore designated as switch cams. It is also possible to reverse this adjustable relationship, i.e., to mount the switches so that they are longitudinally adjustable in the direction of movement of carriage 6 and to mount the cams in fixed position or, alternatively, to make both the switches and the cams adjustable. The feeler microswitches 17 and 18 and the cam switches 37–41 are actuated in such a way that the transverse carriage 6 is able to carry out the appropriate sequence of movements, to be described hereinafter, in accordance with the movement of longitudinal carriage 3.

Figure 6:
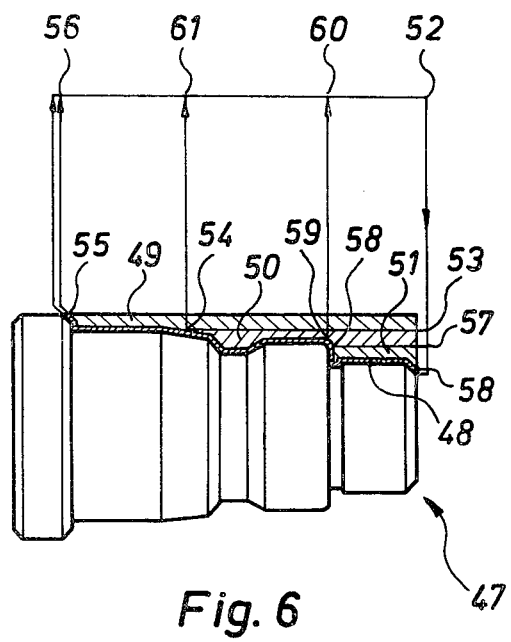
FIG. 6 is an explanatory diagram illustrating the sequence of cutting operations on a workpiece as performable by the apparatus of FIGS. 1–5.

FIG. 6 shows in schematic and diagrammatic form a workpiece indicated generally at 47 which is to be processed by the illustrated sequence of steps using a master pattern plate 63 which has a shape the same as the desired ultimate profile of the workpiece. Although shown in FIG. 6 as sectioned portions, the portions 48, 49, 50 and 51 illustrated therein are intended to designate layers of the material which are successively removed in accordance with the sequence of steps in the operation of the apparatus. The layer 48 which extends along the surface of the finished workpiece is a relatively thin layer and is removed in the final step which is referred to as a smooth cut. During the rough cutting of the workpiece, layers 49, 50 and 51 are sequentially removed.

At the beginning of the operating process, the tool 7 is radially removed from the surface and is in a location designated by point 52 and is perpendicular to the axis of the workpiece 47. A fluid pressure agent from the source of fluid pressure flows through sensor block 12 and stop valve 11 through connecting line 35 to act on the operating piston and cylinder assembly 9 and 10, and fluid under pressure displaced by piston 10 flows away from the assembly through connecting line 36. Movement of cylinder 9 drives the carriage 6 toward the workpiece until the point of the tool arrives at location 53 at which time one of switches 37–41 is operated by one of the suitably adjusted cams 42–46, the selected switch disconnects the magnet of the stop valve 11 from its source of current (FIG. 2) to close that valve so that the feed movement, in a radial direction with respect to the workpiece, ceases. Carriage 3 is then moved along its slide, causing the tool to move longitudinally along the workpiece, removing layer 49. Simultaneously, feeler 13 is moved longitudinally along the pattern 63 until it arrives at a protruding point on the pattern corresponding to point 54 on the workpiece, at which point feeler 13 is deflected and the magnet of the stop valve 11 is energized and therefore the stop valve 11 is opened (FIG. 2) by means of the activation of microswitch 17 which responds to movement of feeler 13. At that point, the feeler arrangement 14, together with sensor block 12, becomes active. From point 54 to point 55, the workpiece is processed in accordance with the contour of master plate 63. At the longitudinal feed limit of carriage 3, a switch, not shown, is actuated by the carriage at point 55, causing the tool 7 to be radially withdrawn to point 56 and returned, by reverse movement of the longitudinal carriage, to starting point 52. Again, this action is controlled by one of the cam switches 37–41 and an assigned one of cams 42–46.

At its return position, carriage 3 actuates a limit switch again commencing the movement of tool 7 from point 52 radially toward the workpiece. At this time, the tool continues until it reaches point 57 at the beginning of the second cutting cycle, at which point the cam switch appropriate to point 53 has in the meantime been rendered ineffective, especially shortly before the return of tool 7 to the starting position 52. When the workpiece arrives at point 57, the assigned cam switch is actuated by a different cam. The feed of tool 7 is then stopped by closing of stop valve 11 and is shifted by movement of longitudinal carriage 3 in parallel to the axis of workpiece 47. When the feeler 13 reaches a point on master plate 63 at which it is deflected, corresponding to point 58 on workpiece 47, then the feeler arrangement 14 and sensor block 12 again become active until point 54 has been reached. The tool 7 is then withdrawn, as has been previously described, to points 61 and 52, sequentially, at which the next operating cycle begins, causing the tool to move to point 58 in FIG. 6. At this point, feeler 13 takes over control of the tool 7 for further processing of the workpiece until point 59 is reached, whereupon the tool is extracted from the workpiece until it reaches point 60 and the longitudinal carriage guides the tool back to starting position 52. Subsequently, and after corresponding adjustment of the sensor block, the layer 48, the smooth cut layer, is removed from the workpiece 47 under the guidance of feeler 13 and the master pattern plate 63. After removal of the layer 48, the tool returns to the starting position 52. The workpiece has then been completely processed by tool 7. A new workpiece is fastened in the chuck of the machine and is processed in accordance with the previously described sequence of steps.

While one advantageous embodiment has been chosen to illustrate the invention, it will be understood by those skilled in the art that various changes and modifications can be made therein without departing from the scope of the invention as defined in the appended claims.

What is claimed is:

1. In an improved apparatus for shaping workpieces in accordance with a pattern, particularly for use in combination with a turning machine of the type having means for supporting a workpiece to be cut, a cutting tool, means for supporting and moving the tool relative to the workpiece, a piston and cylinder assembly having a movable piston coupled to said means for supporting to move said tool, a source of fluid under pressure, a master pattern, a control valve and feeler means for contacting and following the pattern, the improvement comprising the combination of stop valve means having an electrically operated actuator portion for controlling fluid flow to said piston and cylinder assembly;

conduit means interconnecting said source of fluid under pressure, said piston and cylinder assembly, said control valve and said stop valve means, said stop valve being connected between said control valve and said piston and cylinder assembly;

at least one cam and at least one cam-operated switch, one of said cams and switches being movable with said tool for controlling closing actuation of said stop valve; and feeler switch means responsive to deflection of said feeler for controlling opening of said stop valve means when said feeler is in contact with said pattern.

2. An apparatus according to claim 1 and including a plurality of mutually adjustable cams and cam switches, each of said switches being assignable to a predetermined position of said piston and cylinder assembly whereby said cutting tool is operable to remove material from said workpiece in successive layers in sequential operating cycles.

* * * * *